(12) United States Patent
Asano et al.

(10) Patent No.: US 12,078,511 B2
(45) Date of Patent: Sep. 3, 2024

(54) MOUNTING MEMBER AND MOTION GUIDANCE APPARATUS INCLUDING THE MOUNTING MEMBER

(71) Applicant: THK CO., LTD., Tokyo (JP)

(72) Inventors: Yusuke Asano, Tokyo (JP); Yuta Tsujisawa, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 17/781,393

(22) PCT Filed: Dec. 7, 2020

(86) PCT No.: PCT/JP2020/045417
§ 371 (c)(1),
(2) Date: Jun. 1, 2022

(87) PCT Pub. No.: WO2021/117664
PCT Pub. Date: Jun. 17, 2021

(65) Prior Publication Data
US 2023/0003560 A1    Jan. 5, 2023

(30) Foreign Application Priority Data

Dec. 9, 2019   (JP) ................................. 2019-222071

(51) Int. Cl.
*F16H 25/24*    (2006.01)
*F16H 25/22*    (2006.01)
(Continued)

(52) U.S. Cl.
CPC ......... *G01D 11/30* (2013.01); *F16H 25/2204* (2013.01); *F16H 25/24* (2013.01); *G01H 1/003* (2013.01)

(58) Field of Classification Search
CPC ............. F16H 25/2214; F16H 25/2015; F16H 25/2204; F16H 25/24; G01M 13/02; G01B 7/144
See application file for complete search history.

(56) References Cited

U.S. PATENT DOCUMENTS 10,767,741 B1 *   9/2020   Liu ..................... F16H 25/2015

FOREIGN PATENT DOCUMENTS

JP       2007-333195 A    12/2007
JP          6051606 B2    12/2016
(Continued)

OTHER PUBLICATIONS

International Search Report dated Jan. 19, 2021, issued in counterpart Application No. PCT/JP2020/045417. (2 pages).

*Primary Examiner* — Gregory Robert Weber
(74) *Attorney, Agent, or Firm* — WHDA, LLP

(57) ABSTRACT

Provided is a mounting member that allows a sensor such as a vibration sensor to be reliably and easily mounted to a moving member such as a nut of a motion guidance apparatus without need of removing the motion guidance apparatus from equipment, and without need of post-processing even when a motion guidance apparatus such as a ball screw is already mounted to the equipment, and a motion guidance apparatus including this mounting member. A mounting member for mounting a sensor to a motion guidance apparatus having a shaft member extending in a longitudinal direction and a moving member that is mounted so as to be movable along the longitudinal direction with respect to the shaft member, the mounting member including: a fixing portion that can be fixed to a fastening hole formed in the moving member; and a sensor mounting portion to which the sensor is mounted.

9 Claims, 3 Drawing Sheets

(51) Int. Cl.
  *G01D 11/30* (2006.01)
  *G01H 1/00* (2006.01)

(56) References Cited

FOREIGN PATENT DOCUMENTS

JP 2019127951 A * 8/2019
KR 101689090 B1 * 12/2016

* cited by examiner

MOUNTING MEMBER AND MOTION GUIDANCE APPARATUS INCLUDING THE MOUNTING MEMBER

TECHNICAL FIELD

The present invention relates to a mounting member for mounting a sensor to a motion guidance apparatus such as a ball screw, and a motion guidance apparatus including the mounting member.

BACKGROUND ART

Conventionally, for the purpose of monitoring the state of a motion guidance apparatus such as a ball screw, or detecting the position of a moving member, a sensor such as a vibration sensor or a magnetic sensor is mounted to a moving member such as a nut of a ball screw.

For example, in ball screws including a ball screw shaft and a ball screw nut, the ball screw described in Patent Literature 1 includes: a vibration sensor that is mounted to the ball screw nut and detect vibration; a filtering unit that filters out vibration data of a ball screw abnormality detection frequency band from the vibration data detected by the vibration sensor; and an abnormality detection unit for detecting an abnormality of the ball screw based on the vibration data of the ball screw abnormality detection frequency band filtered in the filtering unit.

According to such a ball screw, the vibration data of the ball screw abnormality detection frequency band at normal time is stored, and the stored vibration data of the ball screw abnormality detection frequency band at normal time is compared with the filtered vibration data of the ball screw abnormality detection frequency band to determine an abnormality of the ball screw based on comparison data of the compared vibration data. Therefore, abnormalities of the ball screw can be detected more accurately.

CITATION LIST

Patent Literature

Patent Literature 1: Japanese Patent No. 6051606

DISCLOSURE OF THE INVENTION

Problems to be Solved By the Invention

However, in conventional sensor mounting methods, the sensor is directly mounted to the axial end face of the nut or a flange portion formed on the nut in order to accurately detect the vibration data of the nut, and according to such a mounting method, after the axial end face of the nut or the flange portion are tapped, the sensor is fastened by fastening device such as a screw.

According to such a mounting method, when a ball screw is already mounted to equipment, tapping or the like cannot be performed with the ball screw being mounted to the equipment, and it is necessary to remove the ball screw from the equipment once and perform post-processing, so that a very laborious work is required. Moreover, the sensor may be fixed by using a magnet or an adhesive for mounting the sensor, but according to such a mounting method, there is a problem that the sensor may come off due to vibration or the like in long-term use.

The present invention has been made to solve the above described problem, and has its object to provide a mounting member that allows a sensor such as a vibration sensor to be reliably and easily mounted to a moving member such as a nut of a motion guidance apparatus without need of removing the motion guidance apparatus from the equipment, and without need of post-processing even when a motion guidance apparatus such as a ball screw is already mounted to the equipment, and a motion guidance apparatus including this mounting member.

Means For Solving the Problems

A mounting member according to the present invention that solves the above described problem is a mounting member for mounting a sensor to a motion guidance apparatus having a shaft member extending in a longitudinal direction and a moving member that is mounted so as to be movable along the longitudinal direction with respect to the shaft member, the mounting member including: a fixing portion that can be fixed by a fastening device to a fastening hole formed in the moving member; and a sensor mounting portion to which the sensor is mounted.

Effects of the Invention

According to the mounting member according to the present invention, since the mounting member includes a fixing portion that can be fixed to a fastening hole formed in a moving member and a sensor mounting portion to which the sensor is mounted, it becomes possible to reliably and easily mount the sensor without removing the motion guidance apparatus from the equipment to which the motion guidance apparatus is mounted, and without performing any post-processing.

MODE FOR CARRYING OUT THE INVENTION

Figure 1:
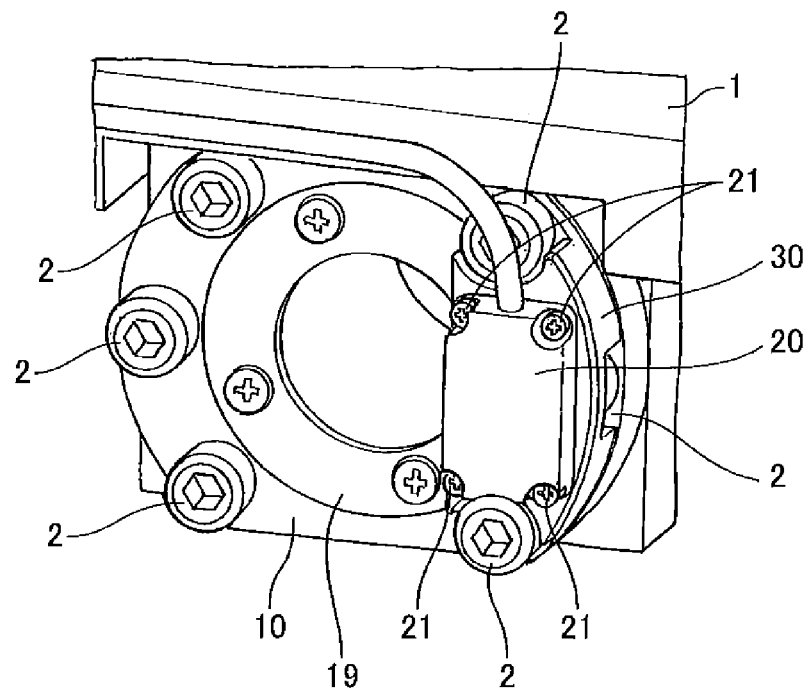
FIG. 1 is a perspective view of equipment and a motion guidance apparatus to which a mounting member according to an embodiment of the present invention is mounted.

Hereinafter, embodiments of the mounting member according to the present invention will be described referring to the drawings. Note that the following embodiments do not limit the invention according to each claim, and not all of the combinations of features described in the embodiments are essential for the solution of the invention.

Figure 2:
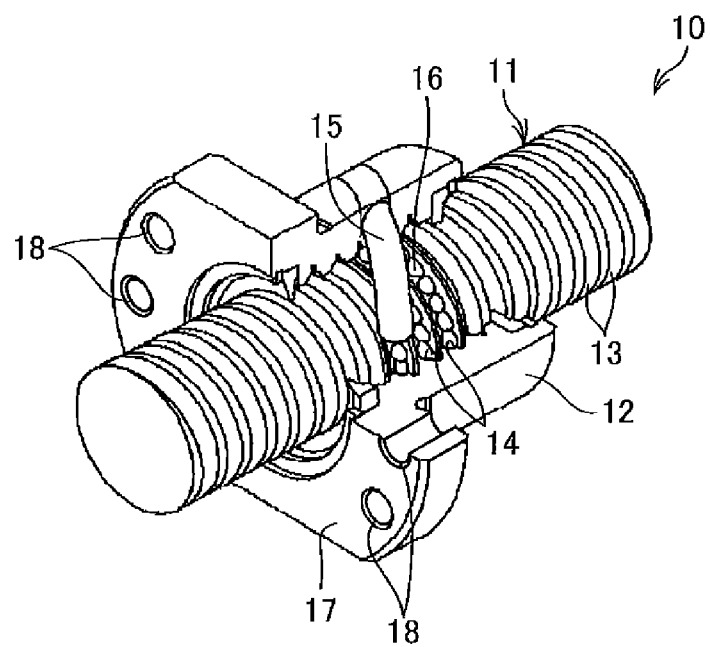
FIG. 2 is a partial sectional perspective view of a motion guidance apparatus to which a mounting member according to an embodiment of the present invention is to be mounted.
Figure 3:
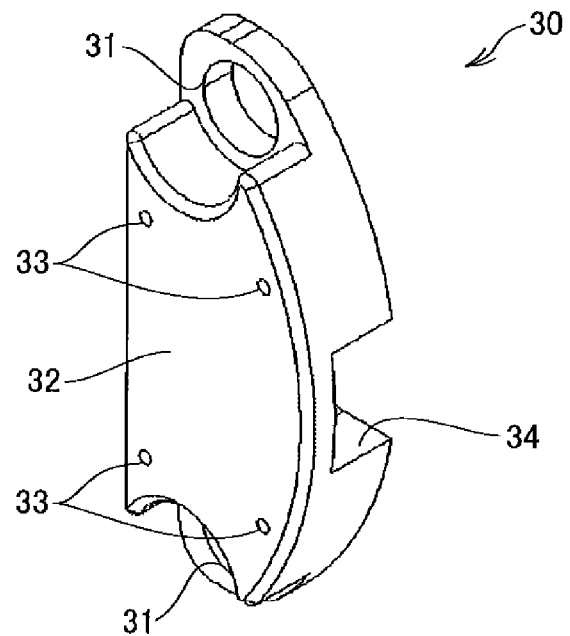
FIG. 3 is a perspective view of a mounting member according to an embodiment of the present invention.
Figure 4:
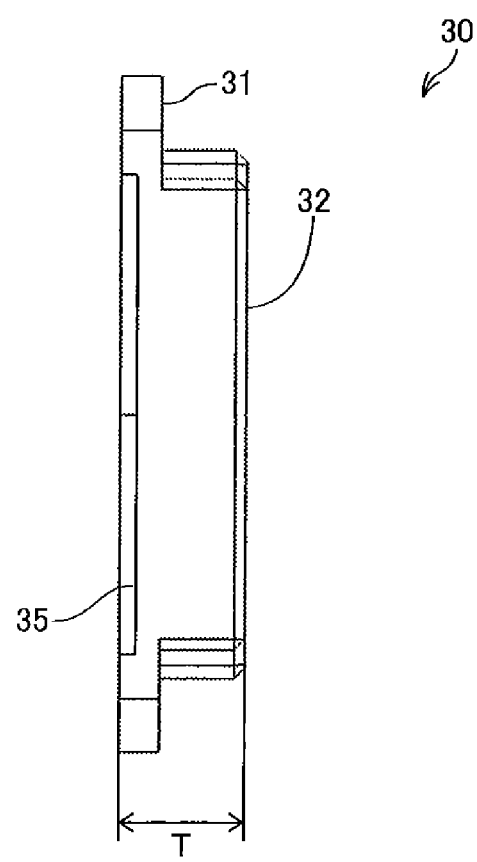
FIG. 4 is a side view of the mounting member according to the embodiment of the present invention.
Figure 5:
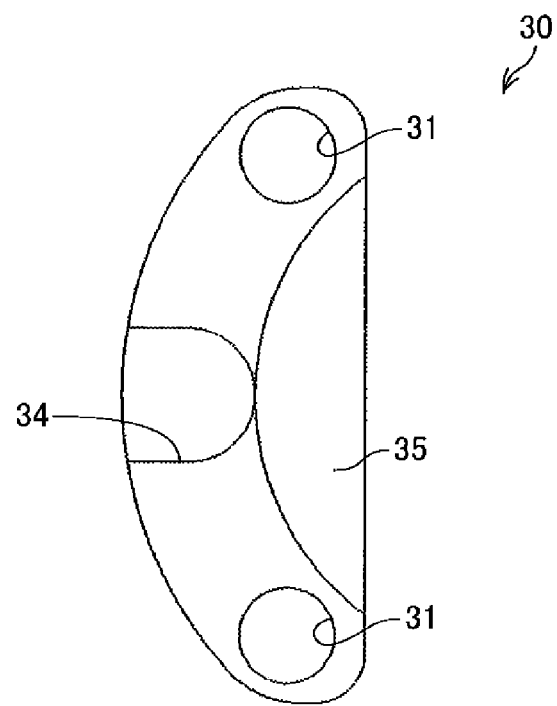
FIG. 5 is a rear view of the mounting member according to the embodiment of the present invention.
Figure 6:
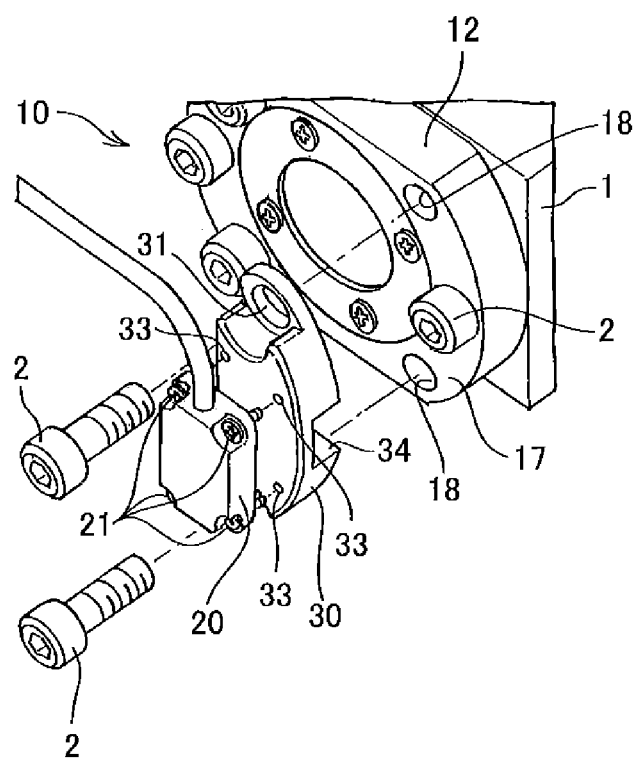
FIG. 6 is an exploded view showing a mounting procedure of the mounting member according to the embodiment of the present invention.

FIG. 1 is a perspective view of equipment and a motion guidance apparatus to which a mounting member according to an embodiment of the present invention is mounted; FIG. 2 is a partial sectional perspective view of a motion guidance apparatus to which a mounting member according to an embodiment of the present invention is to be mounted; FIG. 3 is a perspective view of a mounting member according to an embodiment of the present invention; FIG. 4 is a side view of the mounting member according to the embodiment of the present invention; FIG. 5 is a rear view of the mounting member according to the embodiment of the present invention; and FIG. 6 is an exploded view showing a mounting procedure of the mounting member according to the embodiment of the present invention.

As shown in FIG. 1, a mounting member 30 according to the present embodiment is a member used for mounting a sensor 20 to a ball screw 10 as a motion guidance apparatus mounted to equipment 1. The mounting member 30 is mounted by being co-fastened by a fastening device 2 for mounting the ball screw 10 to the equipment 1, and the sensor 20 is mounted to the mounting member 30 by a sensor mounting device 21.

The sensor 20 includes an enclosure for housing a sensor board, a shielded cable connected to the sensor board, and a cable bush that is mounted to one end of the shielded cable and fixedly holds the shielded cable in the enclosure.

The enclosure is preferably constituted in a divided manner of a divided body consisting of an upper case and a lower case, and the upper case and the lower case are preferably formed of metal such as an aluminum alloy. With the upper case and the lower case, a sensor board housing portion for housing a sensor board is formed.

As shown in FIG. 2, the ball screw 10 to which the mounting member 30 according to the present embodiment is mounted has a screw shaft 11 as a shaft member which extends in a longitudinal direction and in which a spiral ball rolling groove 13 is formed, a nut member 12 as a moving member in which a load rolling groove 14 corresponding to the ball rolling groove 13 is formed, and a return pipe 15 fixed to the nut member 12.

The nut member 12 is mounted to be axially movable with respect to the screw shaft 11 via balls 16 that roll between the ball rolling groove 13 and the load rolling groove 14. The nut member 12 has a flange 17 extended radially on the axial end face, and fastening holes 18 are formed at predetermined intervals in the flange 17. Note that in the nut member 12 of the ball screw 10 to which the mounting member 30 according to the present embodiment is mounted, three fastening holes 18 are formed on each side of the flange 17 and symmetrically with respect to the central axis of the screw shaft 11.

The return pipe 15 is fixed to the nut member 12 so as to jump over the ball rolling groove 13 of the screw shaft 11 by several turns, and the ball 16 which is scooped up from the ball rolling groove 13 of the screw shaft 11 by the end portion of such a return pipe 15 is configured to be sent through the return pipe 15 to the ball rolling groove 13 located several turns before, which causes the ball 16 to infinitely circulate in the nut member 12.

The return pipe 15 is preferably constituted by combining a pair of pipe half-bodies formed to have a substantially semicircular cross-sectional shape, and it is further preferable if each pipe half-body is produced by injection molding of a synthetic resin. Further, it is also preferable if, while a concave groove that serves as a ball return passage is formed in each pipe half-body, a guide groove that guides a retainer for holding a plurality of balls 16 is formed in this concave groove. As an infinite circulation method, a method using a return pipe has been described, but the infinite circulation method is not limited to the return pipe, and various circulation methods can be adopted, for example, the end plate mounted to the axial end portion of the nut member 12 may have a circulation structure, or a scheme in which the balls 16 are returned by a predetermined number of turns using a deflector may be adopted.

Next, referring to FIGS. 3 to 5, the mounting member 30 according to the present embodiment will be described. The mounting member 30 according to the present embodiment is formed to correspond to one side of the flange 17 of the nut member 12, and is formed with fixing portions 31 which are configured to correspond to the fastening holes 18, and a sensor mounting portion 32 in which sensor mounting holes 33 for mounting the sensor 20 are formed.

As shown in FIG. 1, the fixing portion 31 is formed to correspond to the upper and lower fastening holes 18 out of the three fastening holes 18 of the nut member 12, and on the surface facing the nut member 12 of the sensor mounting portion 32, a relief portion 34 that prevents contact with the fastening device 2 to be fastened to the fastening hole 18 at the center is formed.

Thus, by forming a fixing portion 31 corresponding to two or more fastening holes 18 that are not adjacent to each other, it is possible to mount the sensor 20 without removing the other fastening device 2 even when the fastening device 2 is removed from the equipment 1, so that positional deviation of the nut member 12 is unlikely to occur, thus allowing the mounting accuracy to be maintained. Further, by forming a fixing portion 31 and a relief portion 34 in this way, it becomes possible to secure the mounting surface of the sensor 20 and maintain the sensor sensitivity.

The sensor mounting portion 32 is formed such that the mounting surface of the sensor 20 is flat in order to maintain the sensitivity of the sensor 20 to be mounted. Further, as shown in FIG. 4, a thickness T of the sensor mounting portion 32 is preferably formed to be thick to ensure the sensor sensitivity. However, if the sensor mounting portion 32 is too thick, the stroke amount of the nut member 12 decreases, and therefore in order that both the sensor sensitivity and the stroke amount are concurrently secured, the thickness T of the sensor mounting portion 32 is preferably configured to be substantially 1.2 times the thickness of the sensor 20 to be mounted, and more preferably configured to be substantially 1.5 times the thickness of the sensor 20 to be mounted.

Further, as shown in FIGS. 4 and 5, when the cap member 19 or the like is protrudingly mounted to the axial end face of the nut member 12, it is preferable that an interference prevention groove 35 that prevents interference with the cap member 19 is formed. The shape of such an interference prevention groove 35 can be appropriately changed according to the shape of the cap member 19.

Next, the mounting procedure of the mounting member 30 according to the present embodiment will be described with reference to FIG. 6. First, the sensor 20 is mounted to the mounting member 30 by fastening the sensor mounting device 21 to the sensor mounting hole 33 formed in the sensor mounting portion 32. Thereafter, the fastening device 2 that performs co-fastening to mount the mounting member 30 is removed from the ball screw 10 mounted to the equipment 1 via the fastening device 2. At this time, as shown in FIG. 6, it is preferable to remove the fastening device 2 from two of the upper and lower fastening holes 18 that are not adjacent to each other among the three fastening holes 18 formed on one side.

Next, the mounting member 30 is mounted to the flange 17 of the nut member 12, and the fastening device 2 is inserted through the fixing portion 31 to be co-fastened with the nut member 12. At this time, the fastening device 2 may use the removed fastening device 2 as it is, or may use a fastening device that is longer than the removed fastening device 2 by a thickness of the fixing portion 31.

At this time, the fastening device 2 fastened to the fastening hole 18 located between the fastening holes 18 corresponding to the fixing portions 31 is mounted so as to be straddled by the relief portion 34 of the mounting member 30 so that interference between the fastening device 2 and the mounting member 30 is prevented.

Thus, since the sensor 20 can be mounted together with the mounting member 30 to the nut member 12 after the sensor 20 is mounted to the mounting member 30, the sensor 20 can be mounted without compromising workability.

Thus, since the fixing portion 31 is formed at two positions and the fastening device 2 located between the fixing portions 31 is configured to be straddled by the relief portion 34, the removal of the fastening device 2 associated with mounting of the sensor 20 can be performed only by two of the fastening devices 2 corresponding to the fixing portions 31, and the other fastening device 2 can be kept fastened to the equipment 1, it becomes possible to mount the sensor 20 to the nut member 12 without occurrence of positional deviation in the nut member 12 associated with the removal of the fastening device 2.

Further, since the fastening hole 18 used for co-fastening can share a fastening hole 18 for fastening the nut member 12 to the equipment 1, it becomes possible to mount the sensor 20 to the ball screw 10 while it is mounted to the equipment 1 without performing post-processing such as tapping.

In the above described embodiment, the case where a ball screw was used as a motion guidance apparatus has been described, but the motion guidance apparatus may adopt, without being limited to the ball screw, for example, a ball spline in which a spline axis is used for the shaft member and which includes a moving member movable along the spline axis. Moreover, in the above described embodiment, description has been made on a case where three on each side, and a total of six fastening holes 18 are formed in the nut member 12, but the number of fastening holes is not limited to this, but can be appropriately changed to, for example, 4, 8, and the like. It is obvious from the description of claims that embodiments to which such modifications or improvements have been made can also be included in the technical scope of the present invention.

REFERENCE NUMERALS

10 ball screw (motion guidance apparatus), 11 screw shaft (shaft member), 12 nut member (moving member), 17 flange, 18 fastening hole, 20 sensor, 30 mounting member, 31 fixing portion, 32 sensor mounting portion, 34 relief portion.

The invention claimed is:

1. A mounting member for mounting a sensor to a motion guidance apparatus having a shaft member extending in a longitudinal direction and a moving member that is mounted so as to be movable along the longitudinal direction with respect to the shaft member and has a through hole into which the shaft member is inserted, the mounting member comprising:
   a plurality of fastening holes are formed at predetermined intervals in a flange extending in a radial direction of the moving member,
   at least two or more of fixing portions that can be fixed by a fastening device to the fastening holes formed in the moving member, respectively; and
   a sensor mounting portion to which the sensor is mounted, wherein
   the at least two or more of fixing portions are formed corresponding to two or more fastening holes which are not adjacent to each other among the plurality of the fastening holes, and
   a relief portion that prevents contact with the fastening device fastened to another fastening hole, that does not correspond to the at least two or more of fixing portions, is formed in a surface, which faces the moving member, of the sensor mounting portion, and the sensor mounting portion is mounted so that the sensor mounting portion straddles over the fastening device fastened to the another fastening hole.

2. The mounting member according to claim 1, wherein a thickness of the sensor mounting portion is 1.2 times or more a thickness of the sensor.

3. The mounting member according to claim 2, wherein the fixing portion is mounted by being co-fastened with the fastening hole and a mating member to which the moving member is mounted.

4. A motion guidance apparatus, comprising the moving member including the mounting member according to claim 2.

5. The mounting member according to claim 1, wherein the fixing portion is mounted by being co-fastened with the fastening hole and a mating member to which the moving member is mounted.

6. A motion guidance apparatus, comprising the moving member including the mounting member according to claim 5.

7. A motion guidance apparatus, comprising the moving member including the mounting member according to claim 1.

8. The mounting member according to claim 1, wherein the sensor mounting portion is mounted so that the sensor covers the fastening device fastened to the another fastening hole.

9. The mounting member according to claim 1, wherein the relief portion is a recessed surface of the sensor mounting portion.

* * * * *